(12) United States Patent
Hundt

(10) Patent No.: US 6,849,295 B2
(45) Date of Patent: Feb. 1, 2005

(54) METHOD FOR PRODUCING A WINDING PROTECTION FOR TAPE-WOUND CORES

(75) Inventor: Harald Hundt, Dieburg (DE)

(73) Assignee: Vacuumschmelze GmbH, Hanau (DE)

( * ) Notice: Subject to any disclaimer, the term of this patent is extended or adjusted under 35 U.S.C. 154(b) by 384 days.

(21) Appl. No.: 09/945,484

(22) Filed: Aug. 30, 2001

(65) Prior Publication Data

US 2002/0031606 A1 Mar. 14, 2002

Related U.S. Application Data

(63) Continuation-in-part of application No. 09/242,590, filed as application No. PCT/DE97/01779 on Aug. 18, 1997, now abandoned.

(30) Foreign Application Priority Data

Aug. 22, 1996 (DE) .......................................... 199 33 983

(51) Int. Cl.[7] .............................................. C23C 16/00
(52) U.S. Cl. .................. 427/121; 427/255.5; 427/255.6
(58) Field of Search .............................. 427/121, 255.5, 427/255.6

(56) References Cited

U.S. PATENT DOCUMENTS

| | | |
|---|---|---|
| 3,246,627 A | 4/1966 | Loeb et al. |
| 3,342,754 A | 9/1967 | Gorham et al. |
| 4,960,050 A * | 10/1990 | Hatch .......................... 101/348 |
| 5,201,956 A * | 4/1993 | Humphrey et al. ......... 118/716 |
| 5,639,566 A | 6/1997 | Okamura et al. |
| 5,925,420 A | 7/1999 | Lee |

FOREIGN PATENT DOCUMENTS

| | | | |
|---|---|---|---|
| DE | GM 77 26 882 | 12/1977 | |
| DE | 39 32 797 | 4/1990 | |
| EP | 0 226 793 | 7/1987 | |
| EP | 0 351 861 | 1/1990 | |
| EP | 0 621 612 | 10/1994 | |
| EP | 0 677 856 | 10/1995 | |
| JP | 7-211530 | 8/1995 | |
| JP | 07211530 A * | 8/1995 | ............. H01F/1/14 |

OTHER PUBLICATIONS

Jamin et al, "Coil Winding Processes Improved by Parylene Conformal Coating", *Coil-Winding*, Berlin, vol. 26, Jun. 28, 2001. pp. 79–84.

* cited by examiner

*Primary Examiner*—Timothy Meeks
(74) *Attorney, Agent, or Firm*—Schiff Hardin & Waite

(57) ABSTRACT

For manufacturing a winding protection for tape-wound cores that are surrounded with a winding, a polymer film is provided that is deposited onto the tape-wound cores from a vapor phase at room temperature in a drum process. Due to the end face penetration of the polymer into the tape-wound cores, the polymer is solidified and simultaneously surrounds all sides with a thin, uniformly adhering and directly windable layer.

6 Claims, 2 Drawing Sheets

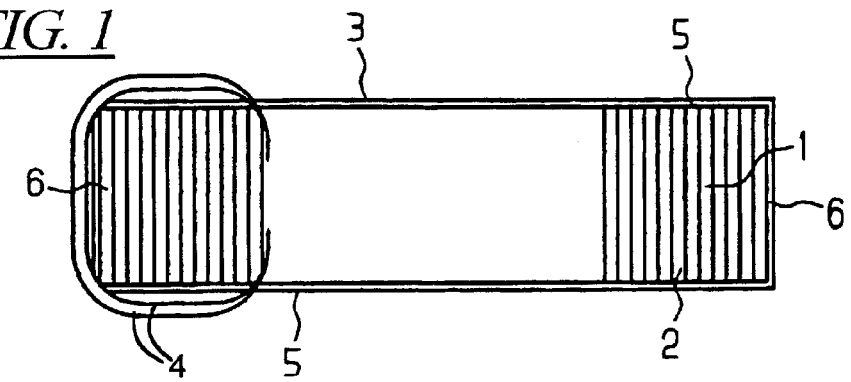
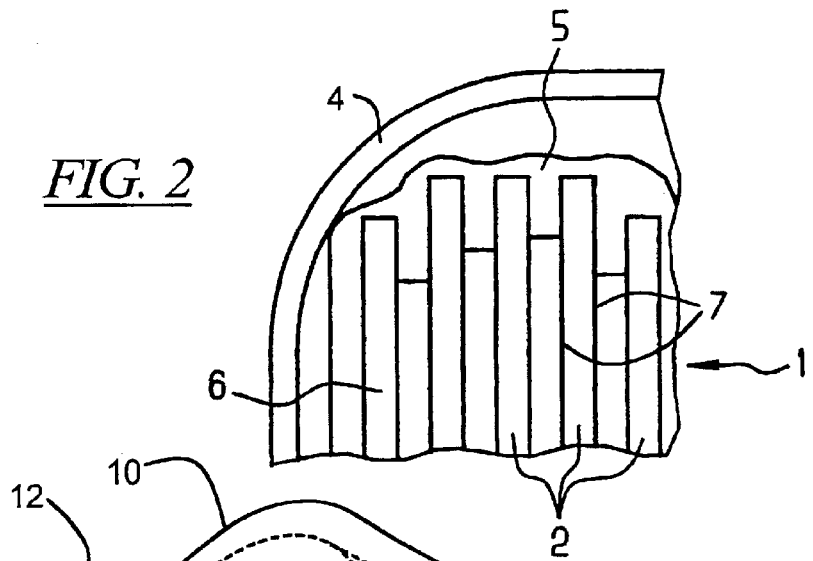
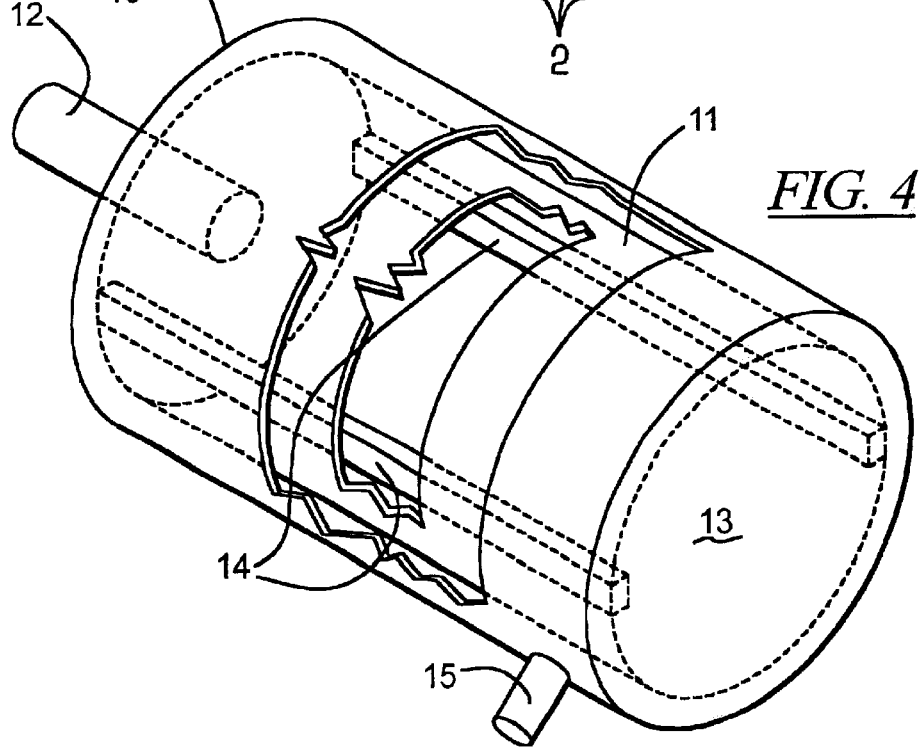

METHOD FOR PRODUCING A WINDING PROTECTION FOR TAPE-WOUND CORES

CROSS-REFERENCE TO RELATED APPLICATION

This application is a continuation-in-part of U.S. Ser. No. 09/242,590, filed Feb. 19, 1999, now abandoned which was a National Stage Application under 35 USC 371 of PCT/DE97/01779, filed Aug. 18, 1997.

BACKGROUND OF THE INVENTION

The invention is directed to a method for producing a winding protection for tape-wound cores with a polymer, particularly to a new hardening and enveloping process for optimally thin-walled insulation and simultaneous hardening of magnetic tape-wound cores.

Magnetic cores for electrical components are implemented as tape-wound cores, particularly as toroidal tape-wound cores, in many instances. These toroidal tape-wound cores usually have a cylindrical circumference and an inside opening in an axial direction. Such toroidal tape-wound cores are wound with one or more windings for manufacturing inductances and transformers. These windings are composed of insulated electrical wires or conductors such as, for example, an enameled copper wire. The winding must thereby be protected against damage by the edges of the magnetic core during winding.

Since toroidal tape-wound cores, which are wound of thin, cut tapes, exhibit extremely sharp edges, an edge protection is necessary. Due to the brittleness of the tapes, an edge protection is also needed for the inner and outer tape plies for toroidal tape-wound cores, that are composed of amorphous or nano-crystalline alloys, to protect them against the forces occurring during winding. In addition, the edge protection must be electrically insulating.

A further demand is the stabilization or, respectively, hardening of the tape-wound core, which represents an extremely unstable formed body because of its structure. This is less true of the inside or outside diameter of the toroidal tape-wound core, since these dimensions are fixed well by point welds at the inner and outer tapes to one another. What is particularly critical here is the core height, since this easily yields a displacement in the axial direction, dependent on various parameters such as, for example, winding tension, tape geometry, surface nature of the tapes, tape width, etc. Extremely different measures are known for preventing this change of the core geometry.

Dribbling and/or saturating the cores with a polymer is notoriously known. The hardening is obtained, for example, by emitting solvent or by a reaction of two components. What is thereby disadvantageous, however, is that a precise setting of the layer thickness is not possible with this method.

JP 7 211 530 A discloses a toroidal tape-wound core of a non-crystalline alloy coated with a polymer layer.

U.S. Pat No. 3,342,754 discloses details of a coating method with which a polymer layer can be applied to a surface. The method disclosed by U.S. Pat. No. 3,342,754 can be implemented under laboratory conditions but is not suited for use in mass production.

A number of methods are known for the "outer" protection of tape-wound cores. EP 0 677 856 A1 and EP 0 226 793 A1 disclose plastic housings that are adapted to the outer shape of the core, whereby an inner hardening can be foregone due to the intrinsically stable structure. German Utility Model 7726882 discloses various envelopes for toroidal cores of coils that are essentially intended to prevent the lacquer of the wire, which is applied onto the core, from being damaged by sharp edges of the core. This armoring with insulating foils, however, is work-intensive since, for example, given a tape-wound core, the foil must always be pulled through the middle of the core when armoring.

EP 0 621 612 A1 discloses the employment of a shrink hose shrunken on in an axial direction of the core that leads to a thin-walled fixing and to a protection of the inside and outside edges given a simultaneous stabilization of the core.

EP 0 351 861 A1 discloses the extrusion-coating of a toroidal tape-wound core with plastic in a tool. In addition to the edge protection and the core solidification, mounting and insulating parts can thus also be simultaneously manufactured.

However, there is the inherent disadvantage in all known methods that, on the one hand, they are extremely work-intensive and therefore not suited for mass production and, on the other hand, an exact and, in particular, extremely thin, constant layer cannot be set with them. Specifically given small cores, the traditional methods have the disadvantage that the ratio between the external volume (growth volume) and the magnetically used volume (net volume) becomes unbeneficial due to the necessary wall thicknesses of the envelope and the necessary joining tolerances when inserting the core. The magnetic use factor (gross volume/net volume) thereby increasingly diminishes and becomes considerably removed from the theoretical ideal value of 1.

The known methods wherein work is carried out with a polymer (saturating, dribbling, eddy sintering, etc.) lead to considerable modifications of the magnetic properties. This results from the volume change of the polymers during or after the polymerization step. The shrinkage forces which occur, as well as compressive and tensile stresses, effect the modification of the tape-wound core properties because of the magneto-striction of the soft-magnetic tapes.

SUMMARY OF THE INVENTION

It is therefore an object of the present invention to specify a manufacturing method suitable for mass production for a winding protection for magnetic cores with a polymer wherein substantial modifications of the magnetic properties do not occur and that leads to an extremely thin-walled insulation given simultaneous solidification on the magnetic tape-wound core.

This object is inventively achieved with a method that is characterized in that a polymer film is deposited on the magnetic core from a vapor phase in a drum process.

Typically, the polymer film is produced in that monomers are first condensed onto the surfaces of the magnetic core in an under-pressure, i.e., in a vacuum as a rule, and polymerized. For producing the monomers, oligomers are evaporated and are subsequently decomposed optically and/or thermally and/or via a plasma.

The particular advantages of the polymer film deposited in the drum process are, on the one hand, hermetically tight layers even beginning with a thickness of a few $\mu$m. In addition, the polymer films are distinguished by high flexibility and dialability and, thus, low susceptibility to tearing. Particularly given tape-wound cores, the monomers can penetrate into the finest cavities since they are present in their gaseous intermediate stage. Effects due to a surface forces such as occur, for example, given lacquers do not occur, i.e., no edge de-moistening or, respectively, bridge formation occurs. In addition, polymer films deposited from the vapor phase also adhere very well to a smooth substrate.

The drum process is also suited for mass production insofar as a great number of toroidal tape-wound cores can thereby be coated in a cost-beneficial way.

In a development of the present invention, a poly-parylene film is deposited as the polymer film. These poly-parylene films are typically poly-paraxylylene films. Parylene is the general rubric for a family of organic polymers that form on surfaces that are treated with a diluted, active gas given an under-pressure or vacuum. Linear, crystalline polymers will occur, which polymers exhibit excellent qualities with reference to the layer thickness. The polymers are extremely inert with respect to chemicals and are pore-free.

The present method is particularly suited for coating tape-wound cores that are composed of tapes of amorphous or crystalline or nano-crystalline alloys.

Typically, the tape-wound cores exhibit a filling factor between 70% and 90%. What is understood by filling factor is the ratio of the magnetic core cross-section to the geometrical core cross-section. Due to this filling factor, the polymer can penetrate between the tapes and this will compact and stabilize the core.

Other advantages and features of the invention will be readily apparent from the following description of the preferred embodiments, the drawings and claims.

BRIEF DESCRIPTION OF THE DRAWINGS

FIG. 1 is a schematic cross-sectional view through a toroidal tape-wound core with parylene fixing and with a wire winding;

FIG. 2 is an enlarged portion of the view of FIG. 1;

FIG. 4 is a perspective view with portions broken away of a rotatable drum chamber for a drum process.

DESCRIPTION OF THE PREFERRED EMBODIMENTS

Figures 3A, 3B:
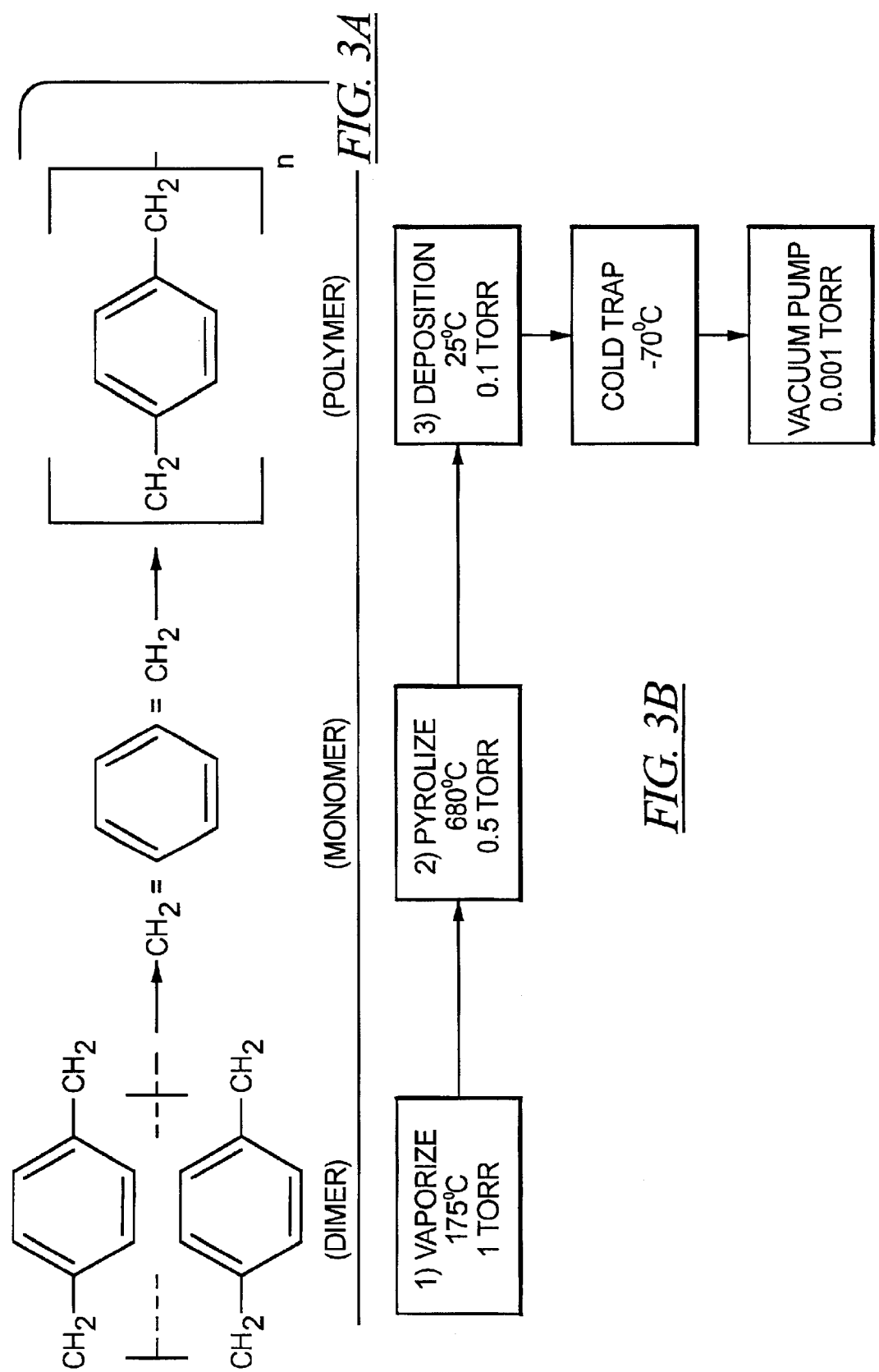
FIG. 3A is a flow chart illustrating the chemical formulas obtained during the step of vaporizing, decomposing and depositing.
FIG. 3B is a flow chart of the steps for coating the cores.

According to FIG. 1, the toroidal tape-wound core 1 is composed of an annular tape-wound core that is composed of tapes 2 of amorphous or nano-crystalline alloy. The outside surfaces 5 and 6 of the toroidal tape-wound core are provided with poly-para-xylylene coating 3. The copper wire 4 is wound around the toroidal core 1.

The poly-para-xylylene coating 3 is deposited onto the toroidal tape-wound core 1 from the vapor phase.

The coating process thereby begins with the heating of powered di-para-xylylene dimers, as a result whereof these convert directly into the gaseous condition, i.e., sublimate. A temperature range of approximately 100° C. to 175° C. and a pressure of approximately 1 Torr have thereby proven especially suited as process parameters.

Subsequently, the gaseous di-para-xylylene dimers are thermally decomposed (pyrolysis) at a temperature in a range of approximately 650° C. to 750° C. and a pressure of approximately 0.5 Torr to form a para-xylylene monomer, as shown in FIGS. 3A and 3B.

These gaseous para-xylylene monomers are then introduced into a process chamber, which is usually a vacuum chamber, and are distributed uniformly therein and condensed onto the surfaces 5 and 6 of the toroidal tape-wound cores 1 as well as onto the cavities 7 (FIG. 2) between the tape layers 2 of the toroidal tape-wound cores 1. A polymerization and a formation of a polymer film then ensue.

The thickness of the polymer film can thereby be designationally set by the supply of para-xylylene monomers. Given toroidal tape-wound cores, a polymer film layer thickness between 5 and 60 $\mu$m has proven especially suited.

Since the poly-para-xylylene film arising in this way exhibits a melting point of >275° C., a temperature-stable winding protection arises, so that the toroidal tape-wound core coated in this way, as component part of an inductive component, withstands demands corresponding to a soldering process made of surface-mounted components (SMD) without melting or, respectively, without damage to the component.

In particular, toroidal tape-wound cores having an outside diameter between 2 and 15 mm can thus be provided with a winding protection that is supplied in the cost-beneficial drum process.

Further, toroidal tape-wound cores coated in this way are suitable for the manufacture of transformers and repeaters wherein freedom from partial discharge is demanded due to the presence of high voltages.

The polymers disclosed in the invention can be commercially obtained under the registered mark GALXYL® from Technipol, Italy, as well as under the trade names Parylene from Novatran, of Great Britain and alpha metals Lötsysteme GmbH/Germany.

The process, as shown in FIG. 3B, has a first step of vaporizing the dimer. The vaporized dimer is then decomposed or pyrolized to form a monomer. This is introduced into the vacuum chamber for deposition onto the cores disposed therein. Subsequently, any remaining gas goes through a cold trap, which is shown at −70° C. To cause this flow, a vacuum pump maintains a vacuum in the system starting as low as 0.001 Torr.

As mentioned, the process is preferably taken in a drum process which uses an apparatus, such as shown in FIG. 4, which has a fixed chamber 10 containing a drum 1 which is rotated within the chamber 10. The chamber 10 has an inlet 12 for allowing the monomers to be introduced into the chamber and to pass into the rotating drum 11. The chamber 10 is provided with a lid 13 and has an exhaust 15 which can go to the cold trap, which removes any excess materials from the gases leaving the chamber 10. The inner rotatable drum or member 11, which may be a basket structure, has ribs or pockets 14 on an outer wall, which ribs are filled with cylindrically-shaped or rod-shaped bar magnets so that any chips or splinters from the cores because of broken tapes will adhere to these ribs and not be embedded into the coating on the cores. It has been found that rotating the drum 11 at a slow rotation of 1 to 5 rotations per minute causes the cores to slide, roll and tumble relative to one another, so that all sides are exposed for receiving the deposition coating of the polymer. This has the advantage that a uniform coating is obtained, unlike previously used processes. Previous processes use conventional chambers, which are static or stationary chambers with fixed planar surfaces or special mountings for supporting the cores in one position during a first deposition step and then the cores were subsequently repositioned to expose the surface areas of the core which were covered during the first deposition step. Thus, the previous processes required at least two deposition steps and provide a polymer film that was inhomogeneous and of different thicknesses over the core surfaces. In a drum process, the drum works with a vapor phase deposition as a common process chamber. This means that gas is introduced into the process chamber under certain conditions and then deposited on the core in a known way. The difference between the drum process and the common process chamber is that, in the drum process, the process chamber is rotating to expose all surfaces so that deposition takes place over the entire surface of the core, whereas in the conventional or previous process, a fixed arrangement of the chamber required repositioning the cores within the chamber and running a subsequent deposition step.

With the inner drum 11 having a diameter of approximately 50 cm and a length of approximately 70 cm, and since the cores are approximately 10 mm outside diameter, the drum can have a capacity of between 30,000 and 50,000 cores. While the coating rate is very slow and may require six to ten hours, a high capacity can still be obtained, since only one deposition step is required to obtain deposition of all surfaces.

In order to obtain a sufficient adhesion of the coating, it is necessary to thoroughly clean the cores, which cleaning may include screening to remove any splinters or chips from the cores followed by an immersion in a solvent bath with a subsequent drying in a warming cabinet. It maybe desirable to pre-coat the cores to improve the adherence, such as with a coupling agent, such as silane, to improve the adhesion of the coating.

Although various minor modifications may be suggested by those versed in the art, it should be understood that I wish to embody within the scope of the patent granted hereon all such modifications as reasonably and properly come within the scope of my contribution to the art.

I claim:

1. A method for manufacturing a winding protection for tape-wound cores with a polymer, said method comprising the steps of providing a plurality of tape-wound cores composed of tapes selected from amorphous and nanocrystalline alloys and said cores having a filling factor of between 70% and 90%; providing a rotatable drum container of a drum process; inserting the plurality of toroidal tape-wound cores into the drum container; while rotating the drum container at a rate of 1 to 5 rotations per minute, creating a vacuum in the drum container and introducing a vapor of a para-xylylene monomer into the rotating drum container to condense on the surfaces of the cores; and then polymerizing the monomer at the surfaces.

2. A method according to claim 1, wherein the step of introducing a vapor of para-xylylene monomers includes evaporating a di-para-xylylene dimer at a temperature range of approximately 100° C.–175° C. and a pressure of 1 Torr, and then thermally decomposing the vaporized di-para-xylylene dimer at a temperature range of approximately 650° C.–750° C. and a pressure of approximately 0.5 Torr to form a para-xylylene monomer.

3. A method according to claim 1, wherein the step of providing a rotation drum container includes providing magnets in the container to collect chips and splinters being separated from the cores.

4. A method according to claim 1, which includes cleaning the cores before inserting to remove any splinters and chips.

5. A method according to claim 4, which, after cleaning, includes pre-coating the cores with a coupling agent.

6. A method according to claim 5, wherein the coupling agent is silane.

* * * * *